(No Model.)

P. DAVIES.
GEAR WHEEL.

No. 581,812.  Patented May 4, 1897.

Witnesses:
B. H. Miller
E. A. Bulloch

Inventor,
Preston Davies,
By his Attorneys,
Baldwin Davidson & Wight

UNITED STATES PATENT OFFICE.

PRESTON DAVIES, OF LONDON, ENGLAND.

GEAR-WHEEL.

SPECIFICATION forming part of Letters Patent No. 581,812, dated May 4, 1897.

Application filed April 10, 1896. Serial No. 586,979. (No model.)

*To all whom it may concern:*

Be it known that I, PRESTON DAVIES, a subject of the Queen of Great Britain, residing at Southfields, London, in the county of Surrey, England, have invented certain new and useful Improvements in and Relating to Gear-Wheels, of which the following is a specification.

My invention, which is more especially applicable to velocipedes, but may be utilized for other driving purposes, relates to gear-wheels which have, in lieu of the well-known projecting teeth, balls or spherical bodies imprisoned within but projecting at intervals from the peripheries thereof or from suitable distance pieces or disks located between two side flanges or collars. The balls or spheres are so mounted and maintained in position that they will be free to revolve in every direction and in some instances have a certain amount of play or movement, but cannot entirely leave their imprisoning-chambers.

My invention relates, further, to the chain used in conjunction with such gear-wheels.

My objects comprise the reduction of friction, the improvement of bite or grip between the gear-wheel and chain and the manner in which the one leaves the other, and the improvements in the methods of construction, as hereinafter indicated.

Figure 1:
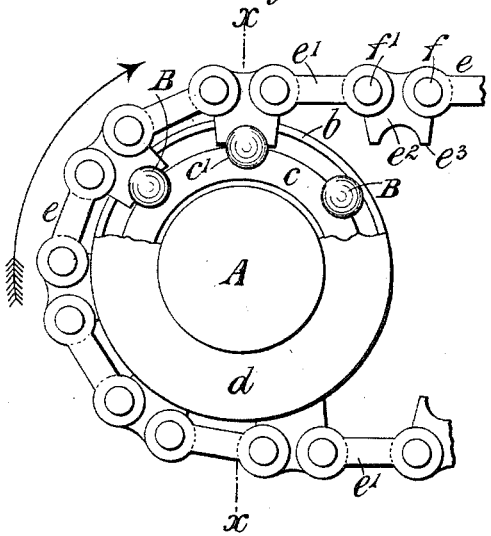
Figure 2:
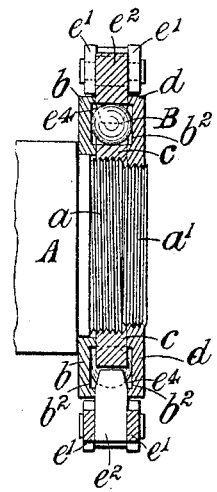
Figure 3:
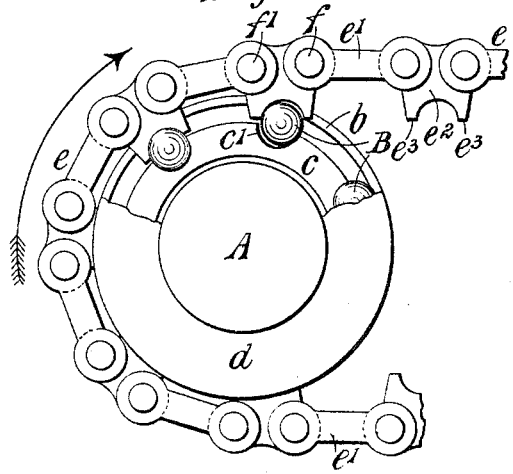

In the accompanying drawings, Figure 1 is a side elevation, partly in section, and Fig. 2 is a vertical transverse section on the line $x\,x$, Fig. 1, illustrating a chain or gear wheel and chain constructed according to my said invention as applied to the hub of a velocipede-wheel. Fig. 3 is a similar view to Fig. 1, showing the position assumed by the balls or spheres at the point where the chain is leaving the gear-wheel.

Like letters indicate corresponding parts throughout the drawings.

A is the hub of a bicycle or other wheel, and B B are the balls or spheres which form the teeth of the gear-wheel, and are preferably mounted or carried as hereinafter described. Upon the hub A is provided a reduced part or portion $a$, having a right-handed screw-thread formed thereon, and a further reduced part or portion $a'$, having a left-handed screw-thread formed thereon.

$b$ is a collar or side flange adapted to fit over the screw-threaded part $a$ and against the shoulder formed by the larger part of the hub A.

$c$ is a distance piece or disk having portions $c'$ milled out of it at regular intervals. This distance piece or disk screws upon the threaded part $a$ and against the collar $b$, so as to clamp or hold the latter tightly in position.

$d$ is another or outer collar or side flange which screws upon the threaded part $a'$, so as to bear tightly against the distance piece or disk $c$, which latter is for this purpose made to slightly overhang the part $a$, as shown, and which distance piece or disk $c$ is thus locked firmly in position, so as to prevent any slackening thereof if the wheel be rotated in an obverse or backward direction.

The collars $b$ and $d$ each have an angular groove $b^2$, by which the said balls are retained at the limit of their roll.

It will be seen that the balls or spheres B being carried out in the peripheral and equidistant parts $c'$ and in the annular grooves formed upon the adjacent or inner surfaces of the collars $b$ and $d$ a certain amount of play or movement of the said balls or spheres is provided and permitted in the latter for the purpose hereinafter specified.

$e$ is the chain, the side links $e'$ of which may be of the ordinary pattern used on velocipedes, but the intermediate pieces or blocks $e^2$ between each pair of such side links are extended, as shown at $e^3\,e^3$, to form an arch or saddle. The parts $e^3\,e^3$ are slightly tapered, as indicated at $e^4$, to facilitate their entrance into the space or clearance between the collars $b$ and $d$.

$f\,f'$ are the pins by means of which the links and blocks of the chain are connected.

On the rotation of the chain $e$ in the direction indicated by the arrows in Figs. 2 and 3 the balls or spheres will during a portion of the revolution of the gear-wheel engage equally in the parts $c'$ and in the arches of the chain-blocks, but during its revolution through the remaining or a certain angle each of the said balls will rise or roll in the manner indicated in Fig. 3, thereby greatly reducing friction between the parts and especially at that point where the chain or its equivalent leaves the gear-wheel.

Although illustrated as applied to the hub of a velocipede-wheel, my invention is by no means limited thereto. It may by obvious modifications be applied to the gear-wheel on the crank-axle of a velocipede or elsewhere.

What I claim as my invention, and desire to secure by Letters Patent, is—

1. A gear-wheel having imprisoned balls as teeth and sockets for the balls larger radially than the imprisoned portions of the balls, thus permitting them to have a radial rolling movement, and having walls extending inwardly to prevent the withdrawal of the balls, substantially as described.

2. In a driving-gear, the combination, with a gear-wheel having imprisoned balls as teeth, of a chain having side links and inwardly-projecting arch or saddle shaped blocks for the purpose of gearing with, and disengaging from, the imprisoned balls substantially as set forth.

3. In combination, a gear-wheel having for teeth balls confined within imprisoning-chambers and a chain having arch or saddle shaped blocks, each ball being capable of rolling or moving bodily radially within its chamber as the corresponding block of the driving-chain leaves it substantially as described.

4. In a gear-wheel having imprisoned balls as teeth, a distance piece or disk provided with milled-out portions forming beds for the balls and adapted to screw onto the hub of a wheel or on an axle.

5. A gear-wheel, comprising a recessed disk, balls serving as teeth arranged in said recesses, collars or side flanges provided with annular grooves serving to retain said balls, said grooves in connection with recesses being of such size as to permit the balls to roll or shift in addition to their rotary movement, about their axes, substantially as set forth.

6. A gear-wheel having in combination imprisoned balls as its teeth, a distance piece or disk having milled-out portions forming beds for the balls, and collars or side flanges having annular grooves serving to retain the said balls and permit them to roll within their imprisoning-chambers substantially as set forth.

7. The combination, in a driving-gear, of a wheel having imprisoned balls as teeth, a milled-out distance piece or disk forming beds for the balls, and collars or side flanges having annular grooves permitting of play or movement of the said balls, and a chain having arch or saddle shaped blocks the bases of which are adapted to enter between the side flanges of the wheel and gear with, and disengage from, the imprisoned balls substantially as set forth.

8. A chain-wheel having ball-teeth arranged in sockets slightly longer radially than the diameter of the balls, to permit them to move bodily radially, but partially closed at their leading ends through which the balls project to prevent them from dropping out.

In testimony whereof I have hereunto subscribed my name.

PRESTON DAVIES.

Witnesses:
A. F. SPOONER,
ALFRED WITHERS.